United States Patent
Chung et al.

(10) Patent No.: US 12,013,297 B2
(45) Date of Patent: Jun. 18, 2024

(54) STRATUM DEFORMATION MONITORING DEVICE, SYSTEM AND METHOD

(71) Applicant: National Central University, Taoyuan (TW)

(72) Inventors: Chih-Chung Chung, Taoyuan (TW); Jui-Ting Lee, Taoyuan (TW); Zih-Yi Li, Taoyuan (TW); Muhammad Saqlain, Taoyuan (TW)

(73) Assignee: National Central University, Taoyuan (TW)

( * ) Notice: Subject to any disclaimer, the term of this patent is extended or adjusted under 35 U.S.C. 154(b) by 78 days.

(21) Appl. No.: 17/968,922

(22) Filed: Oct. 19, 2022

(65) Prior Publication Data

US 2023/0213397 A1  Jul. 6, 2023

(30) Foreign Application Priority Data

Jan. 5, 2022 (TW) .................................. 111100464

(51) Int. Cl.
| | | |
|---|---|---|
| *E02D 1/00* | (2006.01) | |
| *G01K 11/322* | (2021.01) | |
| *G01L 1/24* | (2006.01) | |

(52) U.S. Cl.
CPC .............. *G01L 1/242* (2013.01); *E02D 1/00* (2013.01); *G01K 11/322* (2021.01)

(58) Field of Classification Search
CPC .. E02D 1/00; E02D 1/02; E02D 1/022; E02D 1/025; E02D 1/08
See application file for complete search history.

(56) References Cited

U.S. PATENT DOCUMENTS

| | | | | |
|---|---|---|---|---|
| 2012/0229623 A1* | 9/2012 | Hsieh | .................... | G01V 11/00 |
| | | | | 348/135 |
| 2021/0270685 A1* | 9/2021 | Hong | .................... | G01L 1/242 |

FOREIGN PATENT DOCUMENTS

| | | | | | |
|---|---|---|---|---|---|
| CN | 107063107 A | * | 8/2017 | | |
| CN | 210719251 U | * | 6/2020 | | |
| CN | 111764368 A | * | 10/2020 | | |
| CN | 212454396 U | * | 2/2021 | | |
| CN | 213208933 U | * | 5/2021 | | |
| CN | 113418460 A | * | 9/2021 | | |
| CN | 113418460 A | | 9/2021 | | |
| CN | 113484912 A | * | 10/2021 | .......... | E21B 17/026 |
| CN | 113484912 A | | 10/2021 | | |
| JP | 2000303481 A | * | 10/2000 | .............. | E02D 1/00 |
| JP | 2004293277 A | * | 10/2004 | | |
| JP | 2004309181 A | * | 11/2004 | | |
| WO | WO-2019093966 A1 | * | 5/2019 | ............ | E02D 1/022 |

* cited by examiner

*Primary Examiner* — Herbert K Roberts
(74) *Attorney, Agent, or Firm* — Demian K. Jackson; Jackson IPG PLLC

(57) ABSTRACT

The present invention relates to a stratum deformation monitoring device. The device includes a working tube having an outer surface and an in-tube space and buried into a target stratum; a plurality of deformation monitoring rings, each of which the plurality of deformation monitoring rings are movably assembled on the outer surface of the working tube in equal intervals or unequal intervals; and at least one strain optical fiber movably assembled on the outer surface of the working tube by securing on the plurality of deformation monitoring rings.

10 Claims, 6 Drawing Sheets

STRATUM DEFORMATION MONITORING DEVICE, SYSTEM AND METHOD

CROSS-REFERENCE TO RELATED APPLICATION

This application claims priority benefit to Taiwan Invention Patent Application Serial No. 111100464, filed on Jan. 5, 2022, in Taiwan Intellectual Property Office, the entire disclosures of which are incorporated by reference herein.

FIELD

The present invention relates to a stratum deformation monitoring device, in particular to a tratum deformation monitoring device, system and method that are built up based on a Brillouin frequency shift technology, in which a strain optical fiber and a temperature optical fiber act as master sensors.

BACKGROUND

Due to the demand for water resources increases, the situation of over-pumping groundwater becomes more and more serious, and the resulting differential subsidence affects the safety of the constructing project. Therefore, the land subsidence changes caused by over-pumping of groundwater have become important monitoring data, and the conventional subsidence measurement technology can roughly assort into aerial, ground and underground monitoring, wherein the part of underground monitoring generally includes single-point monitoring, multi-layer monitoring, and domain reflection monitoring.

The single-point system measures the subsidence changes at a fixed position of the monitoring well, and the multi-layer system measures the subsidence changes at different positions of the monitoring well. However, in the conventional subsidence monitoring technology, many human monitoring techniques are included, which affects the accuracy of the data. Therefore, the monthly measured data cannot quickly reflect the subsidence changes. For water pressure monitoring, an additional monitoring well is needed to drill, not only increases the overall monitoring cost, but also affects the correctness of the relationship between water pressure and subsidence.

Time Domain Reflectometry (TDR) monitoring technology is a method of monitoring and detection using electromagnetic waves. The basic principle is similar to that of radar, but the transmission of electromagnetic waves is limited by transmission cables, and the conductivity of groundwater will cause the transmission of electromagnetic waves attenuates as the distance increases. Therefore, the conventional TDR stratum subsidence monitoring technology is faced with the problem of transmission distance caused by signal attenuation, which is difficult to overcome. Although Chien Wei-Feng (2017) proposed the concept of TDR layered sensor, it is still unable to overcome the attenuation of electromagnetic waves in water, and the measurement signal can only reach the underground depth of 40 to 50 meters.

The said conventional techniques have shown that TDR monitoring technology can effectively reduce costs and achieve the purpose of continuously layered monitoring of stratum deformation, but it is difficult to monitor deep stratum deformation and cannot be applied to sites with high subsidence rates.

Hence, there is a need to solve the above deficiencies/issues.

SUMMARY

The present invention relates to a stratum deformation monitoring device, in particular to a tratum deformation monitoring device, system and method that are built up based on a Brillouin frequency shift technology, in which a strain optical fiber and a temperature optical fiber act as master sensors.

The present invention provides a stratum deformation monitoring device. The device includes a working tube having an outer surface and an in-tube space and buried into a target stratum; a plurality of deformation monitoring rings, each of which the plurality of deformation monitoring rings are movably assembled on the outer surface of the working tube in equal intervals or unequal intervals; and at least one strain optical fiber movably assembled on the outer surface of the working tube by securing on the plurality of deformation monitoring rings.

Preferably, the stratum deformation monitoring device further includes one of the working tube that is buried into the target stratum by placing into a working well; at least one temperature optical fiber configured in the in-tube space; a plurality of friction enhancers, each of which the plurality of friction enhancers are secured on the at least one strain optical fiber in equal intervals or unequal intervals; a linear track secured on the outer surface of the working tube and providing a linear path, wherein the plurality of deformation monitoring rings is assembled on the linear track to have a linear movement along the linear path, so to be movably assembled on the outer surface of the working tube, wherein the linear path has a longitudinal direction parallel to an axial direction of the working tube; a limiter secured on the outer surface of the working tube and providing a limited moving range, wherein the plurality of deformation monitoring rings is assembled on the limiter to move within the limited moving range, and movably assembled on the outer surface of the working tube; a fiber box configured at a ground surface of the target stratum and storing that least one strain optical fiber and the at least one temperature optical fiber; an analyzer directly or indirectly connected with both end of the at least one strain optical fiber and one end of the at least one temperature optical fiber, to measure a frequency shift sourced from a scattered light in the at least one strain optical fiber and the at least one temperature optical fiber; and a computing device electrically connected with the analyzer and computing a deformation, a strain or a temperature of the target stratum based on a Brillouin optical time domain measurement technology.

Preferably, each of the plurality of deformation monitoring rings further includes one of: each of the plurality of deformation monitoring rings has an outer side that directly contacts the target stratum and an inner side; a plurality of friction rings surrounding and protruded from the outer side in a circumferential configuration, and each of the plurality of friction rings has a circumferential surface with a normal line parallel to the axial direction; a plurality of strain optical fiber mounting slots disposed on the outer side, configured in amounts of even-number multiples, parallel to the axial direction and perpendicular to the circumferential configuration; a plurality of slider structure formed on and protruded from the inner side, parallel to the axial direction, perpendicular to the circumferential configuration, moving along the liner path provided by the linear track and constrained by the limiter; and a specific angle cut providing for configuring a backfill material conveying pipe or a conveying pipe.

The present invention further provides a stratum deformation monitoring system. The system includes a working tube having an outer surface and an in-tube space and buried into a target stratum; a plurality of deformation monitoring rings, each of which the plurality of deformation monitoring rings are movably assembled on the outer surface of the working tube in equal intervals or unequal intervals; at least one strain optical fiber movably assembled on the outer surface of the working tube by securing on the plurality of deformation monitoring rings; and an analyzer directly or indirectly connected with both end of the at least one strain optical fiber, to measure a frequency shift sourced from a scattered light in the at least one strain optical fiber.

Preferably, the stratum deformation monitoring system further includes one of: the working tube that is buried into the target stratum by placing into a working well; at least one temperature optical fiber configured in the in-tube space; a plurality of friction enhancers, each of which the plurality of friction enhancers are secured on the at least one strain optical fiber in equal intervals or unequal intervals; a fiber box configured at a ground surface of the target stratum and storing that least one strain optical fiber and the at least one temperature optical fiber; the analyzer directly or indirectly connected with the both end of the at least one strain optical fiber and one end of the at least one temperature optical fiber, to measure the frequency shift sourced from the scattered light in the at least one strain optical fiber and the at least one temperature optical fiber; and a computing device electrically connected with the analyzer and computing a deformation, a strain or a temperature of the target stratum based on a Brillouin optical time domain measurement technology.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation of the invention and many of the attendant advantages thereof are readily obtained as the same become better understood by reference to the following detailed description when considered in connection with the accompanying drawing, wherein.

DETAILED DESCRIPTION

Figure 1:
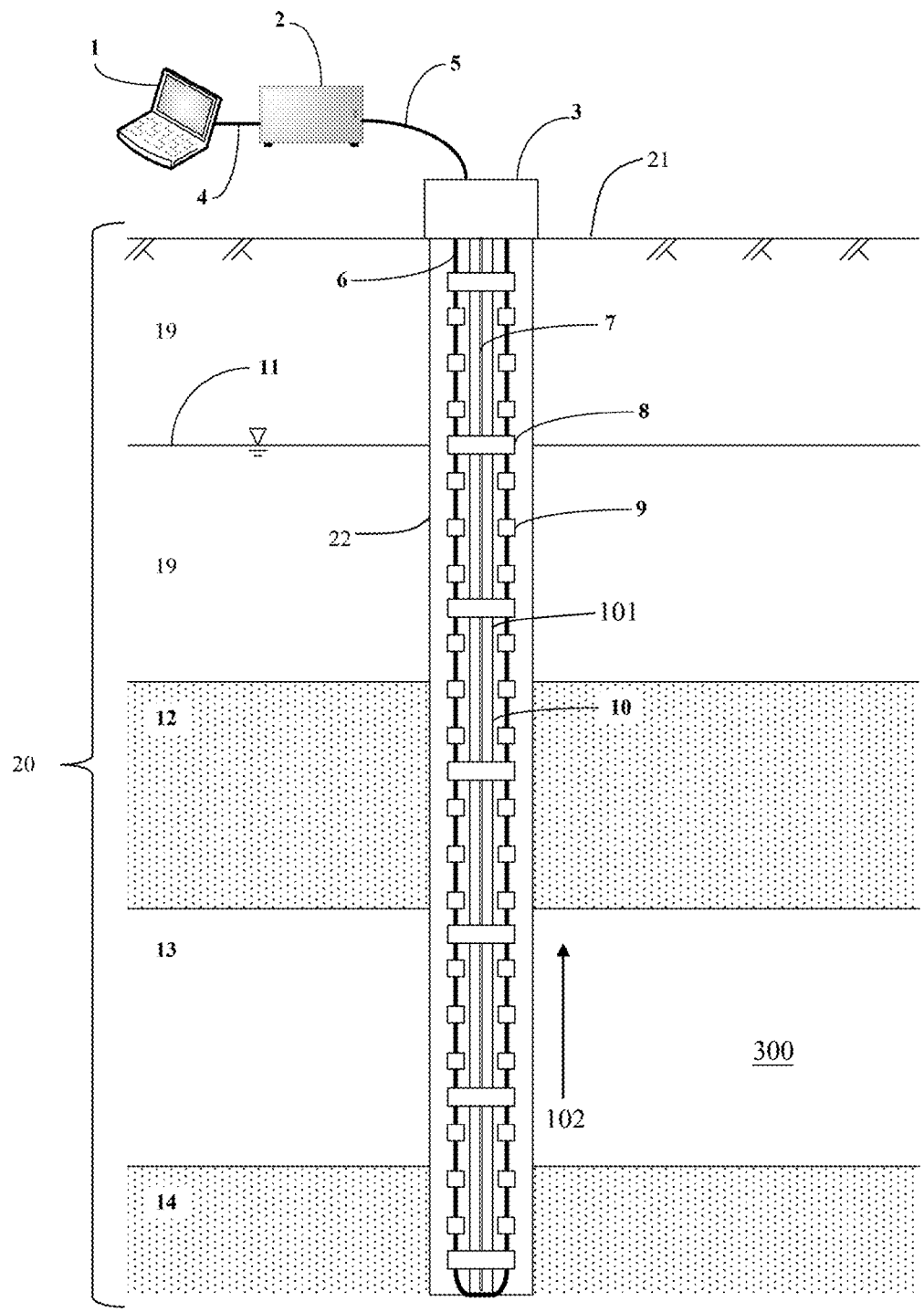
FIG. 1 is a schematic diagram illustrating a stratum deformation monitoring system according to the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

It is to be noticed that the term "including," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

The disclosure will now be described by a detailed description of several embodiments. It is clear that other embodiments can be configured according to the knowledge of persons skilled in the art without departing from the true technical teaching of the present disclosure, the claimed disclosure being limited only by the terms of the appended claims.

The present invention discloses a stratum deformation monitoring device, system and method thereof, which constructs with a strain optical fiber and a temperature optical fiber as main sensors. By using the relationship between the strain of the optical fiber and the temperature change relative to the Brillouin frequency shift of the scattered light in the optical fiber, it can be determined through the Brillouin optical time domain measurement technology, which includes reflection measurement technology and analytical measurement technology. Therefore, after the joint operation of the Brillouin optical time domain reflectometer/analyzer (hereinafter referred to as BOTDR/A), it can monitor the deformation of the target stratum, monitor the continuous settlement changes in the target stratum, or continuously monitor settlement and temperature changes of each depth in the target stratum.

Figure 2:
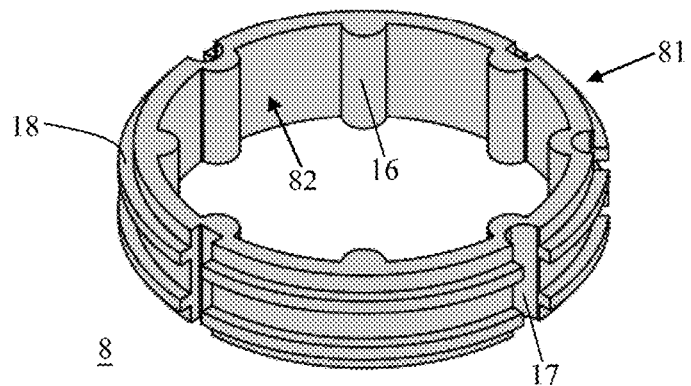
FIG. 2 is a top view schematic diagram illustrating a first embodiment for a structure of a deformation monitoring ring included in a stratum deformation monitoring system according to the present invention.
Figure 3:
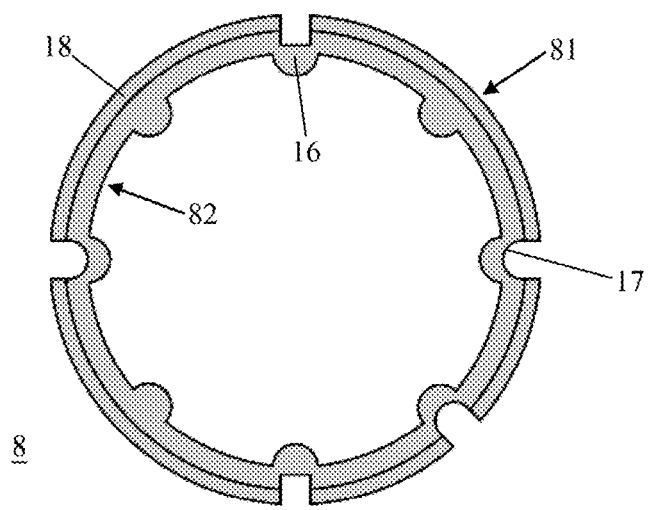
FIG. 3 is a 3D-structural schematic diagram illustrating a first embodiment for a deformation monitoring ring included in a stratum deformation monitoring system according to the present invention.

FIG. 1 is a schematic diagram illustrating a stratum deformation monitoring system according to the present invention. FIG. 2 is a top view schematic diagram illustrating a first embodiment for a structure of a deformation monitoring ring included in a stratum deformation monitoring system according to the present invention. FIG. 3 is a 3D-structural schematic diagram illustrating a first embodiment for a deformation monitoring ring included in a stratum deformation monitoring system according to the present invention. The stratum deformation monitoring system 300 according to the present invention includes main components such as a working tube 10, a strain optical fiber 6, a temperature optical fiber 7 and a BOTDR/A analyzer 2. Preferably, the working tube 10 is, for example but not limitedly, a circular hollow tube made of a polyvinyl chloride (PVC) material or an engineering plastic material. The working tube 10 provides support and installation points for the entire system, and acts as a supportive backbone of the system. The strain optical fiber 6 and the temperature optical fiber 7 are installed on the working tube 10 as main sensors, and the working tube 10 provides support for the strain optical fiber 6 and the temperature optical fiber 7.

The structure of the working tube 10 includes an outer surface 101 and an in-tube space (not shown). The outer surface 101 of the work tube 10 includes a plurality of deformation monitoring rings 8 arranged in equal intervals or unequal intervals. The deformation monitoring rings 8 are assembled or sleeved on the outer surface 101 of the working tube 10 in a slidable or movable manner. Preferably, the assembled deformation monitoring rings 8 slide along an axial direction 102 or a longitudinal direction of the working tube 10, wherein the deformation monitoring ring 8 at the bottom end is secured on the work tube 10, and no slippage is allowed in between. The deformation monitoring ring 8 is buried into the soil of the target stratum 20, preferably bound to the soil tightly.

In this embodiment, the structure of the deformation monitoring ring 8 is preferably, for example but not limitedly, a ring structure. In the detailed structure, on the outer side 81 of the deformation monitoring ring 8 which directly contacts the soil of the target stratum 20, a plurality of friction rings 18 is arranged in a circumferential configuration. The normal line of the circumferential surface formed by the friction ring 18 is approximately parallel to the axial direction 102. The friction ring 18 is structured to protrude from the outer side 81 so as to further extend into the soil of the target stratum 20. The friction between the deformation monitoring ring 8 and the target stratum 20 is strengthened, so that the deformation monitoring ring 8 can effectively reflect the deformation of the target stratum 20. Furthermore, the friction ring 18 can also effectively enhance the overall structural strength and rigidity of the deformation monitoring ring 8.

A plurality of strain optical fiber mounting slots 17 is disposed on the outer side 81 of the deformation monitoring ring 8, preferably configured in amounts of even-number multiples. The axial direction of the strain optical fiber mounting slots 17 is preferably parallel to the axial direction 102 of the working tube 10 and perpendicular to the circumferential configuration of the friction ring 18. A plurality of slider structure 16 is formed on and protruded from the inner side 82. In one embodiment, the slider structure 16 directly contacts outer surface 101 of the working tube 10. Therefore, the slider structure 16 is preferably designed in a circular arc shape to reduce the contact area with the working tube 10, so as to reduce the friction force with the working tube 10. The axial direction of the slider structure 16 is preferably parallel to the axial direction 102 of the working tube 10 and perpendicular to the perpendicular to the circumferential configuration of the friction ring 18, as shown in FIG. 2 and FIG. 3.

The strain optical fiber 6 is secured to the strain optical fiber mounting slots 17 of the deformation monitoring ring 8 through the adhesion of, for example but not limited to, a glue material, so as to be fixed to the deformation monitoring ring 8 and assembled on the working tube 10. The deformation monitoring ring 8 is buried or embedded into the soil of the target stratum 20, and bonded with the soil tightly. When the target stratum 20 is deformed, such as the compression or expansion of soil, the deformation monitoring ring 8 will be forced to produce a corresponding slip change along the axial direction 102 of the working tube 10. The stratum deformation is transmitted to the strain optical fiber 6, and the strain optical fiber 6 is used as the main sensor to detect the stratum deformation. During installation, the deformation monitoring ring 8 can be directly attached to the outer surface 101 of the working tube 10, and then the strain optical fiber 6 is secured into the strain optical fiber mounting slots 17 of the deformation monitoring ring 8 to simplify the installation process.

Because the strain optical fiber mounting slots 17 are preferably configured in amounts of even-number multiples, the strain optical fiber 6 can be arranged around the bottom-end of the working tube 10, and form a U-shaped loop structure on both sides of the working tube 10. Due to the U-shaped loop structure, both ends of the strain optical fiber 6 are connected to the BOTDR/A analyzer 2 at the same time, and can be switched between single-ended reflection measurement mode or double-ended analysis measurement mode. In normal conditions, the BOTDR/A analyzer 2 is used in the double-end analysis measurement mode, and performs BOTDA analysis and measurement on both ends of the strain optical fiber 6 at the same time, so as to obtain the high-precision amount of strain value changes. While any broken is happened at the strain optical fiber 6, the U-shaped loop is interrupted, and the BOTDR/A analyzer 2 is switched to the single-ended reflection measurement mode, and perform BOTDR reflection measurement on one of both ends of the strain optical fiber 6. Then the amount of strain value changes of the strain optical fiber 6 is measured.

Furthermore, due to the U-shaped loop structure, the adjacent deformation monitoring rings 8 can cover a plurality of strain optical fibers 6 more than an even-number multiples, and it can be checked whether the strain optical fibers 6 are loose during the installation process. The subsidence or floating variation of the adjacent deformation monitoring rings 8 is calculated in an average way, so as to eliminate the uncertainty factors of the measurement.

In order to increase the friction between the strain optical fiber 6 and the soil of the target stratum 20, the strain optical fiber 6 also includes a plurality of friction enhancers 9 secured in equal intervals or unequal intervals. The friction enhancer 9 is buried or embedded into the soil of the target stratum 20 together with the strain optical fiber 6, so as to enhance the friction force between the strain optical fiber 6 and the target stratum 20 through the friction enhancer 9, therefore the deformation generated by the target stratum 20 is accurately transmitted to the strain optical fiber 6. The friction enhancers 9 is preferably a friction falcon.

The temperature optical fiber 7 is arranged in the hollow space, i.e. in-tube space, of the working tube 10, and is vertically suspended to the bottom of a working well 22 in a free-hanging manner, so that the temperature optical fiber 7 is not affected by additional stress. It can accurately measure the continuous temperature changes of the target stratum 20 and serve as the source of temperature compensation for the strain optical fiber 6 at the same time.

After the strain optical fiber 6 and the temperature optical fiber 7 are unearthed, they will first be connected to an outdoor waterproof optical fiber box 3, and then connected to the BOTDR/A analyzer 2 through the optical fiber connection cable 5, then connected to the BOTDR/A reader 2 through the optical fiber connector 5, and through the computing device 1, for example but not limited to portable computer or notebook, to controls the BOTDR/A analyzer 2 through the signal transmission line 4 to capture the Brillouin frequency shift change of the strain optical fiber 6 and the temperature optical fiber 7 with the depth of the working well 22. Finally, the relationship between Brillouin frequency shift and strain and temperature is determined by Brillouin optical time-domain measurement technology. After conversion and calculation through computer-aided operations, the land subsidence and temperature changes of each depth soil layer in the stratum can be continuously monitored.

Figure 4:
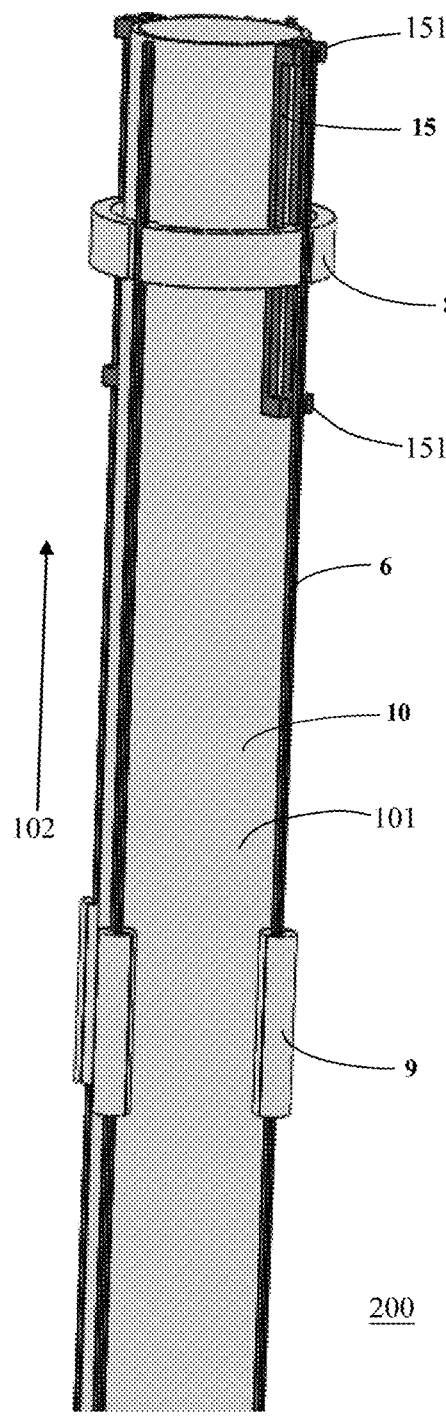
FIG. 4 is a schematic diagram illustrating a partial structure for a linear track and a limiter included in the deformation monitoring system according to the present invention.

FIG. 4 is a schematic diagram illustrating a partial structure for a linear track and a limiter included in the deformation monitoring system according to the present invention. In order to ensure that each deformation monitoring ring 8 can slide in the same direction, a plurality of sets of linear track 15 is also secured on the outer surface 101 of the working tube 10, and the slider structure 16 will move on the linear track 15. The linear track 15 can provide a linear path for the slider structure 16 to perform linear motion back and forth on this linear path, for example but not limitedly, bidirectional sliding. Under the guidance and restriction of the linear track 15, each deformation monitoring ring 8 can be moved in the same direction. The length of the linear track 15 is preferably, but not limitedly, 10 cm or 20 cm.

Meanwhile, limiters 151 are respectively assembled at both ends of the linear track 15, in order to prevent the strain optical fiber 6 from breaking due to allowable tensile length of the strain optical fiber 6 is exceeded when the excessive land subsidence or ground upheaval variation caused by the stratum. A limited moving range is formed on the linear track 15, so that the slider structure 16 moving along the linear track 15 will stop when it touches the limiters 151 at both ends of the linear track 15. And the slider structure 16 and the deformation monitoring ring 8 are limitedly operated within the limited moving range. Thereby, the strain optical fiber 6 is protected, and the entire stratum deformation monitoring system 300 is prevented from being disabled and unable to be operated continually.

Figure 5:
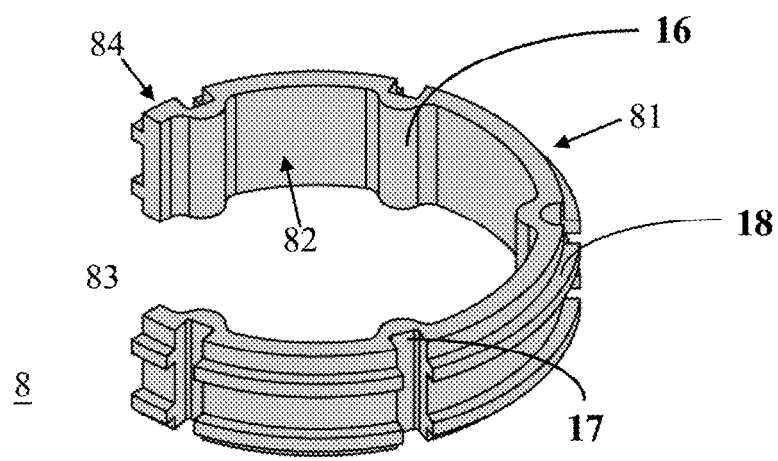
FIG. 5 is a top view schematic diagram illustrating a second embodiment for a structure of a deformation monitoring ring included in the stratum deformation monitoring system according to the present invention.
Figure 6:
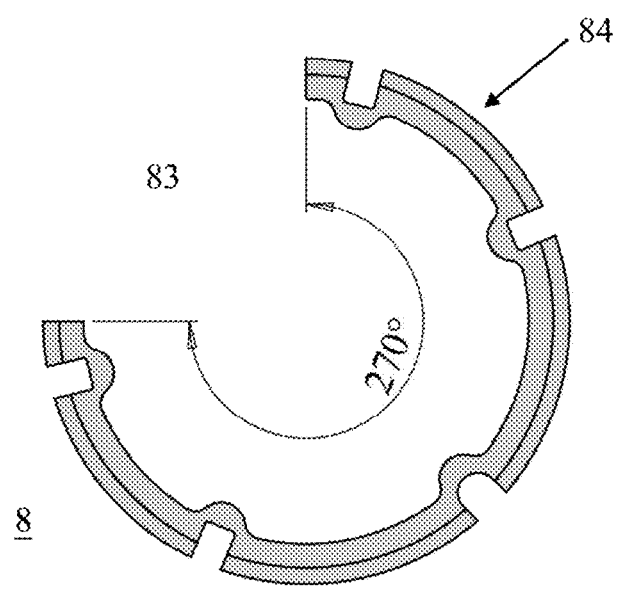
FIG. 6 is a 3D-structural schematic diagram illustrating a second embodiment for a deformation monitoring ring included in the stratum deformation monitoring system according to the present invention.

FIG. 5 is a top view schematic diagram illustrating a second embodiment for a structure of a deformation monitoring ring included in the stratum deformation monitoring system according to the present invention. FIG. 6 is a 3D-structural schematic diagram illustrating a second embodiment for a deformation monitoring ring included in the stratum deformation monitoring system according to the present invention. In this embodiment, the structure of a deformation monitoring ring 8 is preferably, for example but not limitedly, a notch arc structure with a specific angle cut. As shown in FIGS. 5 and 6, the deformation monitoring ring 8 is a 270° circular arc structure 84 with a 90° angle cut 83 with a 90° cut angle. The incision angle can be adjusted according to site requirements and is not limited to 90°.

For example, in one embodiment, the incision angle is adjusted according to the diameter of a working well 22. When the diameter of the working well 22 is between 10 cm, the deformation monitoring ring 8 can be made as an incision arc structure with an 90° angle cut with a 90° cut angle. The reduced volume of the deformation monitoring ring 8 at the incision can be used as the configuration space of the working well 22 for a backfill material conveying pipe, and as the track for the up and down movement of the conveying pipes.

In one embodiment, the stratum deformation monitoring system 300 according to the present invention includes a set of stratum deformation monitoring devices 200, wherein the stratum deformation monitoring device 200 includes a working tube 10, a deformation monitoring ring 8, a strain optical fiber 6, a temperature optical fiber 7, and a friction enhancer 9, etc.

In one embodiment, the stratum deformation monitoring device 200 according to the present invention is preferably assembled by securing a plurality of friction enhancers 9 to a strain optical fiber 6 in advance, and inserting a deformation monitoring ring 8 into an outer surface 101 of a working tube 10, and then sequentially securing the strain optical fiber 6 to strain optical fiber mounting slots 17 of the deformation monitoring ring 8 to form a temporary stratum deformation monitoring assembly. Since the total length of the stratum deformation monitoring assembly is relatively longer, the said stratum deformation monitoring assembly can also be assembled in sections. Preferably, the temperature optical fiber 7 can be placed vertically after the stratum deformation monitoring assembly is installed into a working well 22, then vertically suspended to the in-tube space of the working tube 10, and then vertically suspended to the bottom of the working well 22 to form the stratum deformation monitoring device 200.

In one embodiment, for the installation of the stratum deformation monitoring device 300 according to the present invention, a working well 22 deeply opened into the target stratum 20 is preferably pre-established. The depth of the working well 22 is preferably between 100 m to 1000 m, or more. Then the stratum deformation monitoring device 200 including a working tube 10 and components attached including a deformation monitoring ring 8, a strain optical fiber 6 and friction enhancers 9 are put into the working well 22, and a temperature fiber 7 is put into the working tube 10. Finally, the working well 22 is backfilled, and the entire set of stratum deformation monitoring devices 200 is assembled and embedded into the target stratum 20.

In one embodiment, a target stratum 20 is preferably composed of, for example but not limitedly, a first impermeable layer 12, a compressed soil layer 13, a second impermeable layer 14, and a permeable layer 19, etc. A working tube 10 and its assembly will need to penetrate through a ground surface 21 and a groundwater table 11. The stratum deformation monitoring device, system and method according to the present invention can provide excellent monitoring effects for short-term or long-term stratum deformation monitoring, and is especially suitable for sites with high subsidence rates, such as but not limited to subsidence rates greater than 30 mm/yr in the Taiwan central area.

In summary, the present invention relates to a strain optical fiber secured to a deformation monitoring ring using a Brillouin optical time domain reflectometry or analyzer (BOTDR/A). When the deformation monitoring rings adjacent to each other are compressed or expanded by the stratum soil, for example but not limited to ground upheaval, will lead to the change of the initial Brillouin frequency shift of the strain optical fiber, and the change of the initial Brillouin frequency shift of the temperature optical fiber caused by the ground temperature change, wherein the temperature optical fiber can be used as the temperature compensation of the strain optical fiber. And then through the conversion of the Brillouin frequency shift and the relationship between strain and temperature and related mathematical calculations, the land subsidence and temperature changes of each depth soil layer in the stratum can be continuously monitored.

Figure 7:
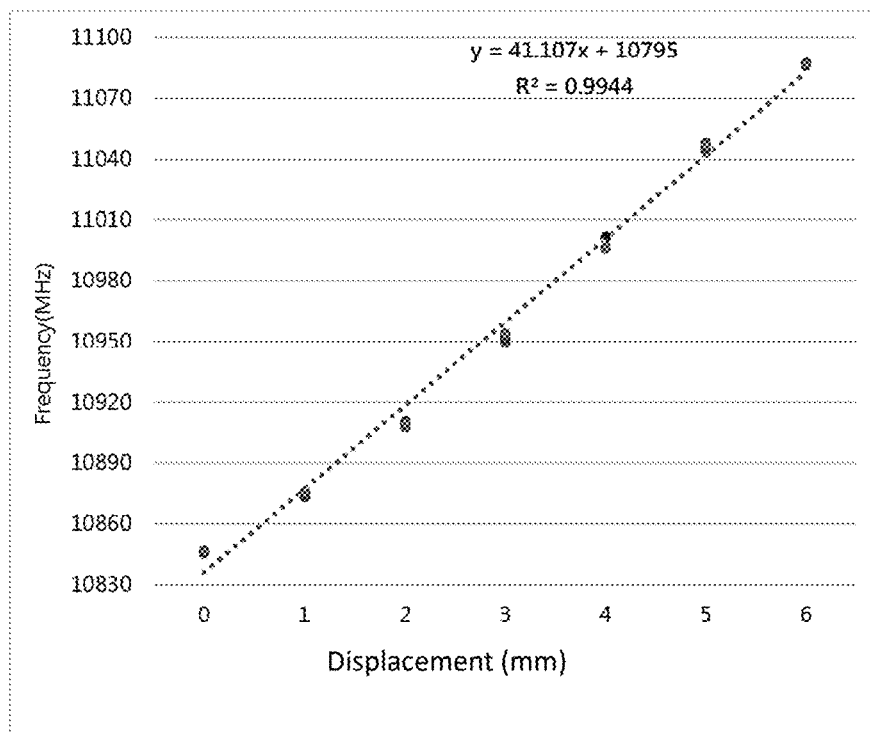
FIG. 7 is a curve chart demonstrating the relationship of the Brillouin frequency shift with respect to the displacement of a strain optical fiber according to the present invention.
Figure 8:
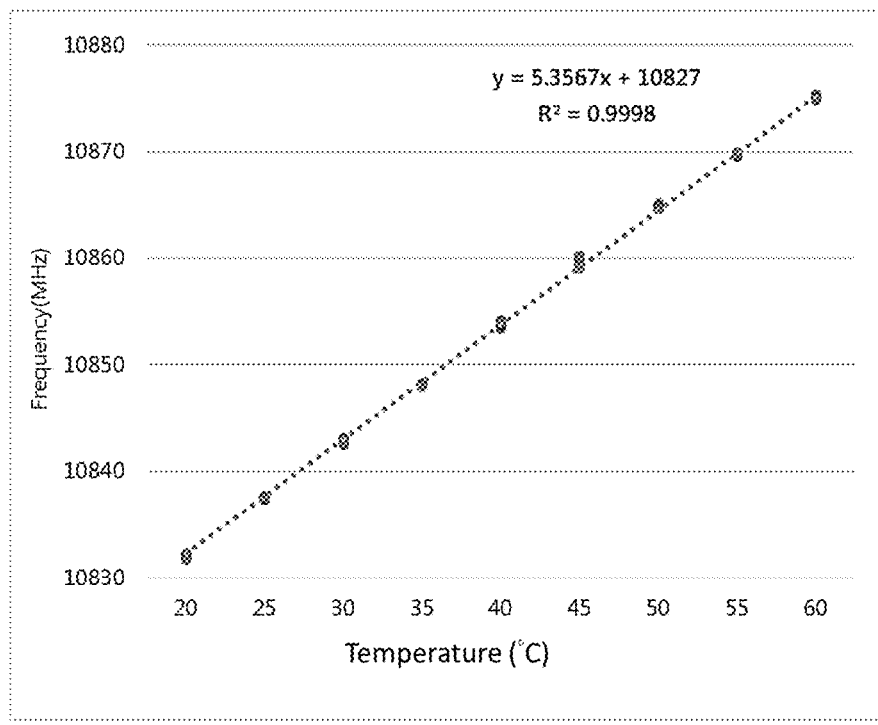
FIG. 8 is a curve chart demonstrating the relationship of the Brillouin frequency shift with respect to the temperature of a temperature optical fiber according to the present invention.

FIG. 7 is a curve chart demonstrating the relationship of the Brillouin frequency shift with respect to the displacement of a strain optical fiber according to the present invention. FIG. 8 is a curve chart demonstrating the relationship of the Brillouin frequency shift with respect to the temperature of a temperature optical fiber according to the present invention. It can be found from the calibration relationship disclosed in FIG. 7 and FIG. 8, while the deformation or displacement (unit mm) of the strain optical fiber 6 is between 0 and 6 mm, and the temperature (unit ° C.) of the temperature optical fiber 7 is between 20° C. and 60° C., the Brillouin frequency shift has a regular linear relationship with the displacement and temperature changes of the optical fiber, and the response is sensitive and clear. When applied to monitor the displacement and temperature of the target stratum 20, the displacement of the strain optical fiber 6 represents the displacement of the stratum, and the temperature of the temperature optical fiber 7 represents the temperature of the stratum.

In one embodiment, the present invention provides a Brillouin Optical Time Domain Reflectometry/Analyzer (BOTDR/A) combined with other related measurement devices, such as a strain optical fiber, a temperature optical fiber, an optical fiber subsidence rings, friction falcons, limiter falcons and tracks, etc., for monitoring methods of measuring continuous land subsidence or ground upheaval changes in a stratum. It is characterized by the use of the BOTDR/A analyzer to measure the relative sliding change of each fiber subsidence ring attached or embedded in PVC conduits at equal intervals, wherein relative sliding change of each fiber subsidence ring related to the strain optical fiber secured on the fiber subsidence rings. Due to the phenomenon of stratum subsidence or ground upheaval, the optical fiber subsidence ring is driven to slide along the PVC conduit, thereby causing the strain optical fiber to generate tensile or compressive strain, and the temperature optical fiber eliminate the temperature strain caused by temperature. Then through each optical fiber subsidence ring, the corresponding current strain is deducted from its initial strain, multiplied by the initial interval length of the optical fiber subsidence ring, and the corresponding compression or floating amount for different depths can be obtained. Then the variation of each optical fiber subsidence ring is accumulated and calculated to obtain the total land subsidence or ground upheaval amount of the stratum at that time.

The initial interval length of the optical fiber subsidence ring can be adjusted according to the depth and characteristics of the local stratum, not limited to a specific length, and can be closer to actual use. The style of the optical fiber subsidence ring can also be changed in size according to the diameter of the local PVC conduit. It can be divided into two styles, one with no opening angle, and another with a 90° opening angle. The angle can be adjusted according to needs. When the diameter of a monitoring well is between 10 cm, the reduced volume of the optical fiber subsidence ring with an opening angle of 90° can provide a configuration space for a backfill material conveying pipe of the monitoring well, and serve as a track for the up and down movement of the conveying pipe. During the installation, the optical fiber subsidence ring can be directly attached to the side of the PVC conduit to reduce tedious installation actions. The sliding contact surface of the optical fiber subsidence ring is an arc shape design, in order to reduce the friction between the optical fiber subsidence ring and the PVC conduit.

The track of the optical fiber subsidence rings and friction falcons secured to the PVC conduit are designed to ensure that each optical fiber subsidence ring can slide in the same direction, and to prevent the strain optical fiber from breaking due to allowable tensile stress of the strain optical fiber is exceeded when the excessive land subsidence or ground upheaval variation caused by the stratum, so as to prevent the monitoring system from being disabled and unable to be operated continually. The optical fiber subsidence rings and friction falcons are secured on the strain optical fiber in each appropriate interval, and increase the friction force between the strain optical fiber and the stratum soil.

The present invention can realize a long-distance measurement device for measuring multi-point land subsidence or ground upheaval changes of a stratum in a single monitoring well, and it eliminates the problem of human error to increase the accuracy of data and greatly reduces the construction cost. By obtaining continuous land subsidence or ground upheaval data, it can accurately interpret the mechanism of land subsidence or ground upheaval in the stratum, therefore provide the basis for the subsequently responses of relevant management units.

Figure 9:
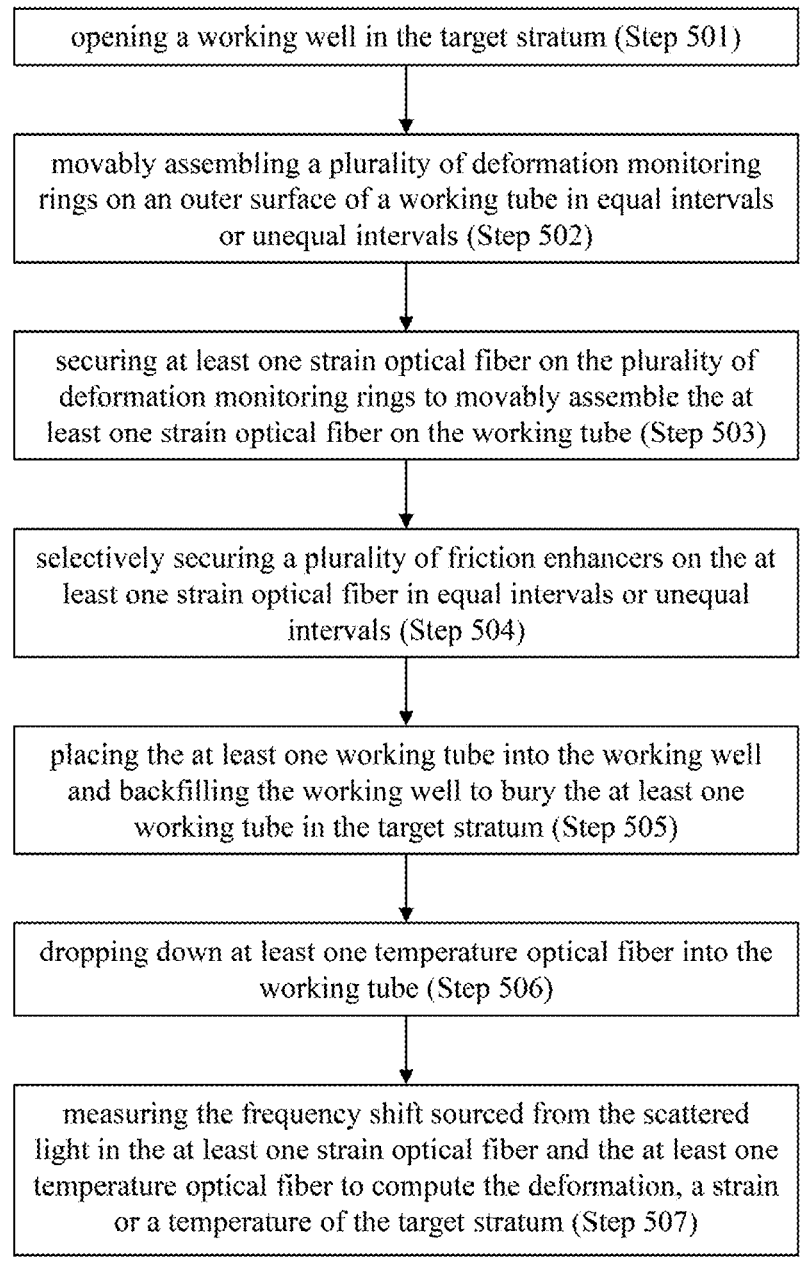
FIG. 9 is a flow chart showing the implementation steps for the stratum deformation monitoring method according to the present invention.

FIG. 9 is a flow chart showing the implementation steps for the stratum deformation monitoring method according to the present invention. In summary, the stratum deformation monitoring method 500 according to the present invention preferably includes the following steps: opening a working well in the target stratum (Step 501); movably assembling a plurality of deformation monitoring rings on an outer surface of a working tube in equal intervals or unequal intervals (Step 502); securing at least one strain optical fiber on the plurality of deformation monitoring rings to movably assemble the at least one strain optical fiber on the working tube (Step 503); selectively securing a plurality of friction enhancers on the at least one strain optical fiber in equal intervals or unequal intervals (Step 504); placing the at least one working tube into the working well and backfilling the working well to bury the at least one working tube in the target stratum (Step 505); dropping down at least one temperature optical fiber into the working tube (Step 506); and measuring the frequency shift sourced from the scattered light in the at least one strain optical fiber and the at least one temperature optical fiber to compute the deformation, a strain or a temperature of the target stratum (Step 507).

There are further embodiments provided as follows.

Embodiment 1: A stratum deformation monitoring device includes: a working tube having an outer surface and an in-tube space and buried into a target stratum; a plurality of deformation monitoring rings, each of which the plurality of deformation monitoring rings are movably assembled on the outer surface of the working tube in equal intervals or unequal intervals; and at least one strain optical fiber movably assembled on the outer surface of the working tube by securing on the plurality of deformation monitoring rings.

Embodiment 2: The stratum deformation monitoring device as described in Embodiment 1 further includes one of: the working tube that is buried into the target stratum by placing into a working well; at least one temperature optical fiber configured in the in-tube space; a plurality of friction enhancers, each of which the plurality of friction enhancers are secured on the at least one strain optical fiber in equal intervals or unequal intervals; a linear track secured on the outer surface of the working tube and providing a linear path, wherein the plurality of deformation monitoring rings is assembled on the linear track to have a linear movement along the linear path, so to be movably assembled on the outer surface of the working tube, wherein the linear path has a longitudinal direction parallel to an axial direction of the working tube; a limiter secured on the outer surface of the working tube and providing a limited moving range, wherein the plurality of deformation monitoring rings is assembled on the limiter to move within the limited moving range, and movably assembled on the outer surface of the working tube; a fiber box configured at a ground surface of the target stratum and storing that least one strain optical fiber and the at least one temperature optical fiber; an analyzer directly or indirectly connected with both end of the at least one strain optical fiber and one end of the at least one temperature optical fiber, to measure a frequency shift sourced from a scattered light in the at least one strain optical fiber and the at least one temperature optical fiber; and a computing device electrically connected with the analyzer and computing a deformation, a strain or a temperature of the target stratum based on a Brillouin optical time domain measurement technology.

Embodiment 3: The stratum deformation monitoring device as described in Embodiment 2, each of the plurality of deformation monitoring rings further includes one of: each of the plurality of deformation monitoring rings has an outer side that directly contacts the target stratum and an inner side; a plurality of friction rings surrounding and protruded from the outer side in a circumferential configuration, and each of the plurality of friction rings has a circumferential surface with a normal line parallel to the axial direction; a plurality of strain optical fiber mounting slots disposed on the outer side, configured in amounts of even-number multiples, parallel to the axial direction and perpendicular to the circumferential configuration; a plurality of slider structure formed on and protruded from the inner side, parallel to the axial direction, perpendicular to the circumferential configuration, moving along the liner path provided by the linear track and constrained by the limiter; and a specific angle cut providing for configuring a backfill material conveying pipe or a conveying pipe.

Embodiment 4: The stratum deformation monitoring device as described in Embodiment 2, the plurality of friction enhancers is buried into the target stratum to increase a friction force between the at least one strain optical fiber and the target stratum.

Embodiment 5: The stratum deformation monitoring device as described in Embodiment 2, the working tube includes materials selected from a PVC material, an engineering plastics and a combination thereof and the computing device is a portable computer or a notebook computer.

Embodiment 6: A stratum deformation monitoring system includes: a working tube having an outer surface and an in-tube space and buried into a target stratum; a plurality of deformation monitoring rings, each of which the plurality of deformation monitoring rings are movably assembled on the outer surface of the working tube in equal intervals or unequal intervals; at least one strain optical fiber movably assembled on the outer surface of the working tube by securing on the plurality of deformation monitoring rings; and an analyzer directly or indirectly connected with both end of the at least one strain optical fiber, to measure a frequency shift sourced from a scattered light in the at least one strain optical fiber.

Embodiment 7: The stratum deformation monitoring system as described in Embodiment 1 further includes one of: the working tube that is buried into the target stratum by placing into a working well; at least one temperature optical fiber configured in the in-tube space; a plurality of friction enhancers, each of which the plurality of friction enhancers are secured on the at least one strain optical fiber in equal intervals or unequal intervals; a fiber box configured at a ground surface of the target stratum and storing that least one strain optical fiber and the at least one temperature optical fiber; the analyzer directly or indirectly connected with the both end of the at least one strain optical fiber and one end of the at least one temperature optical fiber, to measure the frequency shift sourced from the scattered light in the at least one strain optical fiber and the at least one temperature optical fiber; and a computing device electrically connected with the analyzer and computing a deformation, a strain or a temperature of the target stratum based on a Brillouin optical time domain measurement technology.

Embodiment 8: A stratum deformation monitoring method includes: movably assembling a plurality of deformation monitoring rings on an outer surface of a working tube in equal intervals or unequal intervals; securing at least one strain optical fiber on the plurality of deformation monitoring rings to movably assemble the at least one strain optical fiber on the working tube; burring at least the working tube into a target stratum; and measuring a frequency shift sourced from a scattered light in the at least one strain optical fiber to compute a deformation of the target stratum.

Embodiment 9: The stratum deformation monitoring method as described in Embodiment 8 further includes one of: dropping down a temperature optical fiber into the working tube; securing a plurality of friction enhancers on the at least one strain optical fiber in equal intervals or unequal intervals; opening a working well in the target stratum; placing the working tube, the at least one strain optical fiber, the plurality of deformation monitoring rings and the plurality of friction enhancers into the working well; backfilling the working well to bury the working tube, the at least one strain optical fiber, the plurality of deformation monitoring rings and the plurality of friction enhancers in the target stratum; and measuring the frequency shift sourced from the scattered light in the at least one strain optical fiber and the at least one temperature optical fiber to compute the deformation, a strain or a temperature of the target stratum.

Embodiment 10: The stratum deformation monitoring method as described in Embodiment 9 further includes one of: rendering an analyzer to directly or indirectly connect with both end of the at least one strain optical fiber and one end of the at least one temperature optical fiber measure the frequency shift sourced from the scattered light in the at least one strain optical fiber and the at least one temperature optical fiber; and rendering a computing device to connect with the analyzer to compute the deformation, the strain or the temperature of the target stratum based on a Brillouin optical time domain measurement technology.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. A stratum deformation monitoring device, comprising:
   a working tube having an outer surface and an in-tube space and buried into a target stratum;
   a plurality of deformation monitoring rings, each of which the plurality of deformation monitoring rings are movably assembled on the outer surface of the working tube in equal intervals or unequal intervals; and
   at least one strain optical fiber movably assembled on the outer surface of the working tube by securing on the plurality of deformation monitoring rings.

2. The stratum deformation monitoring device as claimed in claim 1, further comprising one of:
   the working tube that is buried into the target stratum by placing into a working well;
   at least one temperature optical fiber configured in the in-tube space;
   a plurality of friction enhancers, each of which the plurality of friction enhancers are secured on the at least one strain optical fiber in equal intervals or unequal intervals;
   a linear track secured on the outer surface of the working tube and providing a linear path, wherein the plurality of deformation monitoring rings is assembled on the linear track to have a linear movement along the linear path, so to be movably assembled on the outer surface of the working tube, wherein the linear path has a longitudinal direction parallel to an axial direction of the working tube;
   a limiter secured on the outer surface of the working tube and providing a limited moving range, wherein the plurality of deformation monitoring rings is assembled on the limiter to move within the limited moving range, and movably assembled on the outer surface of the working tube;
   a fiber box configured at a ground surface of the target stratum and storing that least one strain optical fiber and the at least one temperature optical fiber;
   an analyzer directly or indirectly connected with both end of the at least one strain optical fiber and one end of the at least one temperature optical fiber, to measure a frequency shift sourced from a scattered light in the at least one strain optical fiber and the at least one temperature optical fiber; and
   a computing device electrically connected with the analyzer and computing a deformation, a strain or a temperature of the target stratum based on a Brillouin optical time domain measurement technology.

3. The stratum deformation monitoring device as claimed in claim 2, wherein each of the plurality of deformation monitoring rings further comprises one of:
   each of the plurality of deformation monitoring rings has an outer side that directly contacts the target stratum and an inner side;
   a plurality of friction rings surrounding and protruded from the outer side in a circumferential configuration, and each of the plurality of friction rings has a circumferential surface with a normal line parallel to the axial direction;
   a plurality of strain optical fiber mounting slots disposed on the outer side, configured in amounts of even-number multiples, parallel to the axial direction and perpendicular to the circumferential configuration;
   a plurality of slider structure formed on and protruded from the inner side, parallel to the axial direction, perpendicular to the circumferential configuration, moving along the liner path provided by the linear track and constrained by the limiter; and
   a specific angle cut providing for configuring a backfill material conveying pipe or a conveying pipe.

4. The stratum deformation monitoring device as claimed in claim 2, wherein the plurality of friction enhancers is buried into the target stratum to increase a friction force between the at least one strain optical fiber and the target stratum.

5. The stratum deformation monitoring device as claimed in claim 2, wherein the working tube comprises materials selected from a PVC material, an engineering plastics and a combination thereof and the computing device is a portable computer or a notebook computer.

6. A stratum deformation monitoring system, comprising:
   a working tube having an outer surface and an in-tube space and buried into a target stratum;
   a plurality of deformation monitoring rings, each of which the plurality of deformation monitoring rings are movably assembled on the outer surface of the working tube in equal intervals or unequal intervals;
   at least one strain optical fiber movably assembled on the outer surface of the working tube by securing on the plurality of deformation monitoring rings; and
   an analyzer directly or indirectly connected with both end of the at least one strain optical fiber, to measure a frequency shift sourced from a scattered light in the at least one strain optical fiber.

7. The stratum deformation monitoring system as claimed in claim 6, further comprising one of:
   the working tube that is buried into the target stratum by placing into a working well;
   at least one temperature optical fiber configured in the in-tube space;
   a plurality of friction enhancers, each of which the plurality of friction enhancers are secured on the at least one strain optical fiber in equal intervals or unequal intervals;
   a fiber box configured at a ground surface of the target stratum and storing that least one strain optical fiber and the at least one temperature optical fiber;
   the analyzer directly or indirectly connected with the both end of the at least one strain optical fiber and one end of the at least one temperature optical fiber, to measure the frequency shift sourced from the scattered light in the at least one strain optical fiber and the at least one temperature optical fiber; and
   a computing device electrically connected with the analyzer and computing a deformation, a strain or a temperature of the target stratum based on a Brillouin optical time domain measurement technology.

8. A stratum deformation monitoring method, comprising:
   movably assembling a plurality of deformation monitoring rings on an outer surface of a working tube in equal intervals or unequal intervals;

securing at least one strain optical fiber on the plurality of deformation monitoring rings to movably assemble the at least one strain optical fiber on the working tube;

burring at least the working tube into a target stratum; and measuring a frequency shift sourced from a scattered light in the at least one strain optical fiber to compute a deformation of the target stratum.

9. The stratum deformation monitoring method as claimed in claim 8, further comprising one of:

dropping down a temperature optical fiber into the working tube;

securing a plurality of friction enhancers on the at least one strain optical fiber in equal intervals or unequal intervals;

opening a working well in the target stratum;

placing the working tube, the at least one strain optical fiber, the plurality of deformation monitoring rings and the plurality of friction enhancers into the working well;

backfilling the working well to bury the working tube, the at least one strain optical fiber, the plurality of deformation monitoring rings and the plurality of friction enhancers in the target stratum; and measuring the frequency shift sourced from the scattered light in the at least one strain optical fiber and the at least one temperature optical fiber to compute the deformation, a strain or a temperature of the target stratum.

10. The stratum deformation monitoring method as claimed in claim 9, further comprising one of:

rendering an analyzer to directly or indirectly connect with both end of the at least one strain optical fiber and one end of the at least one temperature optical fiber measure the frequency shift sourced from the scattered light in the at least one strain optical fiber and the at least one temperature optical fiber; and rendering a computing device to connect with the analyzer to compute the deformation, the strain or the temperature of the target stratum based on a Brillouin optical time domain measurement technology.

* * * * *